United States Patent
Tanaami et al.

(10) Patent No.: US 11,414,053 B2
(45) Date of Patent: Aug. 16, 2022

(54) VEHICLE WIPER CONTROL DEVICE AND VEHICLE WIPER CONTROL METHOD

(71) Applicant: MITSUBA Corporation, Gunma (JP)

(72) Inventors: Tetsuyoshi Tanaami, Gunma (JP); Hiroki Hoshino, Gunma (JP); Takeshi Ikeda, Gunma (JP); Takashi Tai, Gunma (JP)

(73) Assignee: MITSUBA Corporation, Gunma (JP)

( * ) Notice: Subject to any disclaimer, the term of this patent is extended or adjusted under 35 U.S.C. 154(b) by 0 days.

(21) Appl. No.: 17/262,190

(22) PCT Filed: Jul. 2, 2019

(86) PCT No.: PCT/JP2019/026300
§ 371 (c)(1),
(2) Date: Jan. 21, 2021

(87) PCT Pub. No.: WO2020/021994
PCT Pub. Date: Jan. 30, 2020

(65) Prior Publication Data
US 2021/0300300 A1      Sep. 30, 2021

(30) Foreign Application Priority Data
Jul. 24, 2018   (JP) .............................. JP2018-138537

(51) Int. Cl.
*B60S 1/08*       (2006.01)
*B60S 1/16*       (2006.01)
*B60S 1/24*       (2006.01)

(52) U.S. Cl.
CPC ............. *B60S 1/0896* (2013.01); *B60S 1/166* (2013.01); *B60S 1/245* (2013.01)

(58) Field of Classification Search
CPC ........ B60S 1/0896; B60S 1/166; B60S 1/245; B60S 1/485; B60S 1/0862; B60S 1/0844;
(Continued)

(56) References Cited

U.S. PATENT DOCUMENTS

| | | | |
|---|---|---|---|
| 2009/0119865 A1* | 5/2009 | Amagasa .............. | B60S 1/0814 15/250.31 |
| 2015/0082575 A1* | 3/2015 | Kimura .................... | H02P 6/08 15/250.12 |
| 2015/0353058 A1* | 12/2015 | Ernst .................... | B60S 1/0866 134/18 |

FOREIGN PATENT DOCUMENTS

| | | |
|---|---|---|
| JP | H01175550 | 7/1989 |
| JP | 2000280867 | 10/2000 |

(Continued)

OTHER PUBLICATIONS

"International Search Report (Form PCT/ISA/210) of PCT/JP2019/026300", dated Aug. 27, 2019, with English translation thereof, pp. 1-3.

(Continued)

*Primary Examiner* — Katina N. Henson
(74) *Attorney, Agent, or Firm* — JCIPRNET

(57) ABSTRACT

Disclosed is a vehicle wiper control device which includes: wiper blades that can be disposed on a surface to be wiped and that perform a reciprocating wiping motion between a lower reversal position and an upper reversal position which are set on the surface to be wiped; an electric motor that reciprocates the wiper blades on the surface to be wiped; a drive portion that drives the electric motor; and a load calculation portion that calculates a load on the electric motor while the wiper blades wipe from the upper reversal position to the lower reversal position. If the calculated load value exceeds a predetermined threshold, the drive portion performs wiper stop processing for stopping the wiper blades at the lower reversal position or at a storage position which is set below the lower reversal position.

7 Claims, 5 Drawing Sheets

(58) Field of Classification Search
CPC .. B60S 1/0859; B60S 1/08; B60S 1/26; B60S 1/38; B60S 1/0866
USPC .......... 15/250.12, 250.17, 250.001
See application file for complete search history.

(56) References Cited

FOREIGN PATENT DOCUMENTS

| JP | 2003040087 | 2/2003 |
|---|---|---|
| JP | 2008238899 | 10/2008 |
| JP | 2011131779 | 7/2011 |
| JP | 2013052826 | 3/2013 |
| JP | 2018102128 | 6/2018 |
| KR | 20090024377 | 3/2009 |

OTHER PUBLICATIONS

"Search Report of Europe Counterpart Application", dated Aug. 3, 2021, p. 1-p. 8.
"Written Opinion of the International Searching Authority (Form PCT/ISA/237)" of PCT/JP2019/026300, dated Aug. 27, 2019, with English translation thereof, pp. 1-17.

* cited by examiner

VEHICLE WIPER CONTROL DEVICE AND VEHICLE WIPER CONTROL METHOD

CROSS-REFERENCE TO RELATED APPLICATION

This application is a 371 application of the International PCT application serial no. PCT/JP2019/026300, filed on Jul. 2, 2019, which claims the priority benefit of Japan Patent Application No. 2018-138537, filed on Jul. 24, 2018. The entirety of each of the above-mentioned patent applications is hereby incorporated by reference herein and made a part of this specification.

BACKGROUND

Technical Field

The disclosure relates to a vehicle wiper control device and a vehicle wiper control method.

Related Art

A technique is known in which an electric motor is stopped when a rotation position of the electric motor does not reach a target position in order to prevent the electric motor (wiper motor) which reciprocates a wiper blade from being continuously energized in an overloaded state.

LITERATURE OF RELATED ART

Patent Literature

Patent literature 1: Japanese Patent Application Laid-Open No. 2013-52826

SUMMARY

Problems to be Solved

However, in the aforementioned conventional technique, it is difficult to stop the electric motor in a manner of not obstructing a view of a driver when the load is high. For example, if a position of the wiper blade when the electric motor is stopped is near the middle between a lower reversal position and an upper reversal position, the wiper blade may obstruct the view of the driver.

Therefore, in one aspect, the present invention aims to stop an electric motor in a manner that a wiper blade does not obstruct a view of a driver when a load on the electric motor is relatively high.

Means to Solve Problems

In one aspect, a vehicle wiper control device is provided which includes: wiper blades that are capable of being disposed on a surface to be wiped of a windshield glass of a vehicle and that perform a reciprocating wiping motion between a lower reversal position and an upper reversal position which are set on the surface to be wiped;
an electric motor that reciprocates the wiper blades on the surface to be wiped;
a drive part that drives the electric motor;
a load calculation part that calculates a load on the electric motor while the wiper blade wipes from the upper reversal position to the lower reversal position;
a load determination part that compares a calculated value of the load calculated by the load calculation part with a predetermined threshold; and
a memory device that memorizes a wiper stop processing program for stopping the wiper blades, wherein
in a case that the load determination part determines that the calculated value exceeds the threshold, the drive part executes the wiper stop processing programs, and performs wiper stop processing for stopping the wiper blade at the lower reversal position or at a storage position set below the lower reversal position to prohibit a next wiping motion.

Effect

In one aspect, according to the present invention, it is possible to stop an electric motor in a manner that a wiper blade does not obstruct a view of a driver when a load on the electric motor is relatively high.

DESCRIPTION OF THE EMBODIMENTS

Each example is described below in detail with reference to the accompanying drawings.

Figure 1:
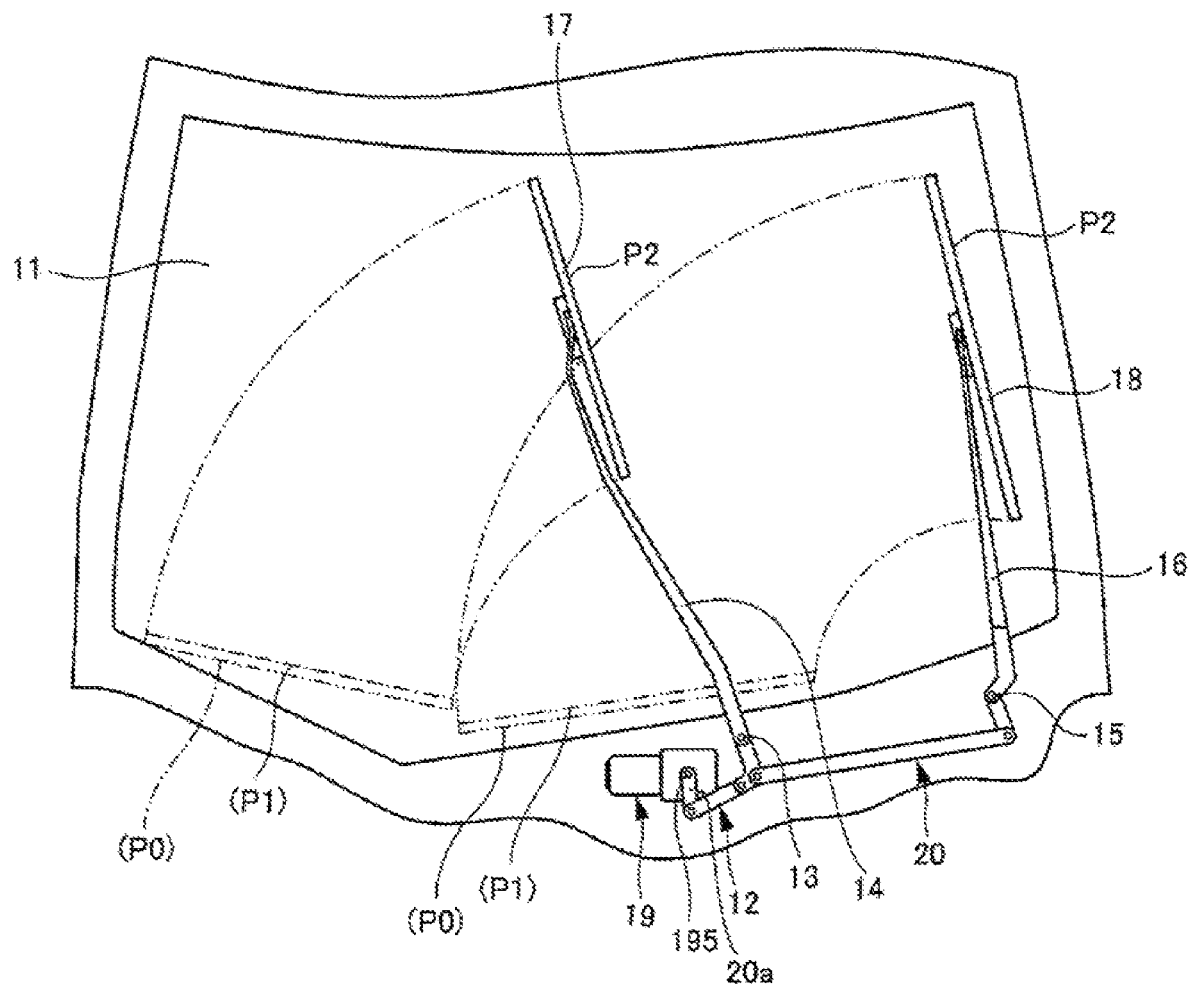
FIG. 1 is an illustrative diagram of an outline of a wiper device to which a vehicle wiper control device is applied.

FIG. 1 is an illustrative diagram of an outline of a wiper device 12 to which a vehicle wiper control device is applied. The wiper device 12 is arranged with respect to a front windshield glass 11 of a vehicle. Moreover, the wiper device 12 wipes the front windshield glass 11. Hereinafter, a surface of the front windshield glass 11 that is wiped by the wiper device 12 is also referred to as a "surface to be wiped".

The wiper device 12 includes wiper arms 14 and 16, wiper blades 17 and 18, a wiper motor unit 19, and a power transmission mechanism 20.

The wiper arms 14 and 16 respectively rotate about the rotation shafts 13 and 15. The rotation shafts 13 and 15 are connected to the wiper motor unit 19 via the power transmission mechanism 20.

The wiper blades 17 and 18 are respectively attached to free ends of the wiper arms 14 and 16. The wiper blades 17 and 18 can be arranged on the surface to be wiped of the front windshield glass 11 and perform a reciprocating wiping motion between a lower reversal position P1 and an upper reversal position P2 which are set on the surface to be wiped. Moreover, in FIG. 1, the wiper blades 17 and 18 are shown at the upper reversal position P2. Moreover, basically, the wiper blades 17 and 18 synchronously perform the reciprocating wiping motion between the lower reversal position P1 and the upper reversal position P2. In addition, the wiper blades 17 and 18 can be stored at a storage position P0. The wiper blades 17 and 18 are held at the storage position P0 at an off state of the wiper device 12 or the like.

The wiper motor unit 19 drives the wiper arms 14 and 16 via the power transmission mechanism 20, thereby causing the wiper blades 17 and 18 to perform the reciprocating wiping motion. The wiper motor unit 19 includes, for example, a wiper motor 192 (see FIG. 2) which is a brushless motor. In the wiper motor unit 19, the power transmission mechanism 20 is connected to an output shaft 195.

The power transmission mechanism 20 is formed in a manner of including a crank arm 20a and other links and the like. The power transmission mechanism 20 transmits power from the wiper motor unit 19 to the wiper arms 14 and 16 via the rotation shafts 13 and 15.

Figure 2:
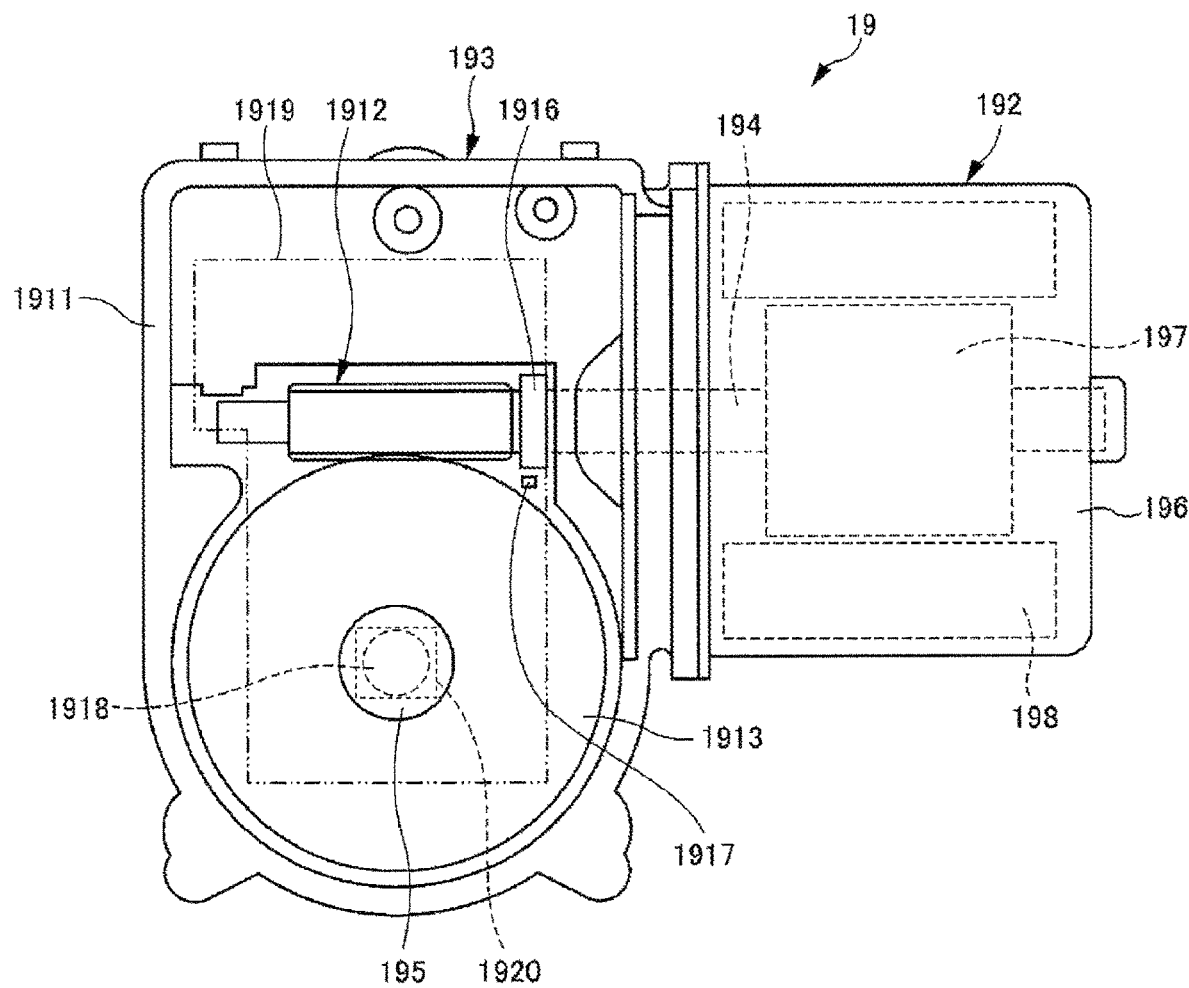
FIG. 2 is a cross-sectional view of a main part showing an example of a wiper motor unit.

FIG. 2 is a bottom view showing an example of the wiper motor unit 19. In FIG. 2, the wiper motor unit 19 is shown in a state that a lower cover is removed to show the inside.

The wiper motor unit 19 includes the wiper motor 192 capable of forward and reversal rotation (an example of an electric motor) and a gearbox 193. Rotation of a motor shaft 194 of the wiper motor 192 is decelerated in the gearbox 193 and output to the output shaft 195. The wiper motor 192 is accommodated in a case 196. The wiper motor 192 includes a rotor 197 and a stator 198. The rotor 197 includes a permanent magnet (not shown). The stator 198 is in a form of an annulus around the rotor 197. In the stator 198, coils of U, V, and W phases (not shown) are wound around a stator core. A rotation number (speed) and a rotation direction of the wiper motor 192 are controlled by energizing the coils of each phase. The wiper motor 192 controls an on time width (duty) of an inverter circuit of a drive circuit 320 by pulse width modulation (PWM) control.

A case frame 1911 of the gearbox 193 is attached to an opening side edge of the case 196. A front end of the motor shaft 194 protrudes from the case 196 and is housed in the case frame 1911. A worm 1912 is formed at the front end of the motor shaft 194. The worm 1912 is meshed with a worm gear 1913 that is rotatably supported by the case frame 1911. The output shaft 195 rotatably supported by the case frame 1911 is integrally attached to the worm gear 1913. Moreover, a deceleration mechanism may be further arranged between the worm gear 1913 and the output shaft 195.

The rotation output generated by the wiper motor 192 is output to the output shaft 195 in a decelerated state via the worm 1912 and the worm gear 1913. The crank arm 20a (see FIG. 1) of the power transmission mechanism 20 is attached to the output shaft 195. When the wiper motor 192 is actuated, the crank arm 20a is driven via the output shaft 195, and the wiper arms 14 and 16 are actuated via a link mechanism of the power transmission mechanism 20 connected to the crank arm 20a.

A multi-pole magnetizing magnet 1916 is attached to the motor shaft 194. A Hall integrated circuit (IC) 1917 is arranged in the case frame 1911 in a manner of facing an outer peripheral part of the multi-pole magnetizing magnet 1916. For example, three Hall ICs 1917 are arranged at positions having an angle difference of 120 degrees with respect to the center of the motor shaft 194. A pulse signal out of phase by 120 degrees is output from the three Hall ICs 1917. Based on this signal, a rotation angle (rotation position) of the motor shaft 194 can be detected.

A magnet 1918 for detecting output shaft rotation is attached to a bottom surface of the worm gear 1913. A printed circuit board 1919 is attached to the case frame 1911. On the printed circuit board 1919, a Hall IC 1920 is arranged in a way of facing the magnet 1918. From the Hall IC 1920, a signal corresponding to a magnetic flux (magnetic flux from the magnet 1918) which changes according to the rotation angle of the output shaft 195 is output. Based on this signal, a rotation angle (rotation position) of the output shaft 195 can be detected.

Figure 3:
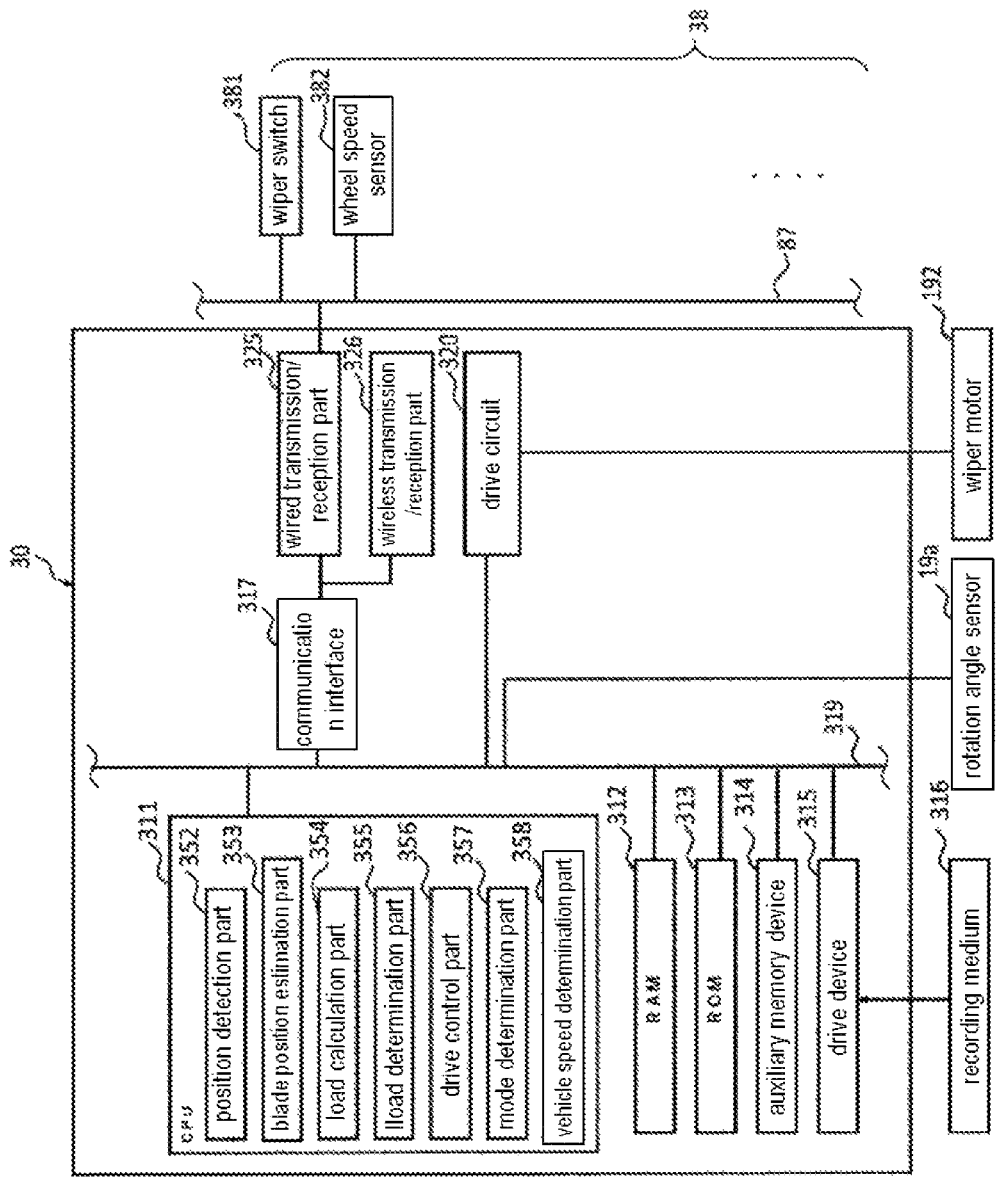
FIG. 3 is a diagram showing an example of a hardware configuration of the vehicle wiper control device.

FIG. 3 is a diagram showing an example of a hardware configuration of a vehicle wiper control device 30. FIG. 3 schematically illustrates another in-vehicle electronic machine 38, the wiper motor 192, and the like in association with the hardware configuration of the vehicle wiper control device 30.

As shown in FIG. 3, the in-vehicle electronic machine 38 includes a wiper switch 381, a wheel speed sensor 382, and the like.

The wiper switch 381 is arranged at a position that can be operated by the user, for example, on the steering column. The wiper switch 381 is a switch (operation member) that allows various settings for the wiper device 12, for example, a user interface that can be operated to turn on/off the wiper device 12, select a wiping mode (a type of the wiping motion), select a wiping speed, and the like. Moreover, the wiper switch 381 may be achieved by, for example, a touch panel (not shown) of a display device (not shown) mounted on an instrument panel or the like.

The wheel speed sensor 382 is arranged on each wheel, but may be arranged only on drive wheels. A detection value of the wheel speed sensor 382 may be in a form of a pulse signal. Each detection value of the wheel speed sensor 382 is periodically output to a network 87 such as a controller area network (CAN). Moreover, each detection value of the wheel speed sensor 382 (hereinafter, also referred to as "wheel speed information") may be converted into a conversion value to the vehicle speed via a brake control device (not shown), and then periodically output to the network 87.

In addition, the wiper motor 192 and a rotation angle sensor 19a for detecting the rotation angle of the wiper motor 192 are connected to the vehicle wiper control device 30. Moreover, the rotation angle sensor 19a may be an element of the in-vehicle electronic machine 38. The rotation angle sensor 19a includes the Hall ICs 1917 and 1920 described above.

The vehicle wiper control device 30 is in a form of a computer, and may be embodied as, for example, an electronic control unit (ECU). For example, the vehicle wiper control device 30 may be embodied as a body ECU that controls a door lock or the like, or may be embodied as an ECU different from the body ECU.

As shown in FIG. 3, the vehicle wiper control device 30 includes a central processing unit (CPU) 311, a random access memory (RAM) 312, a read only memory (ROM) 313, an auxiliary memory device 314, a drive device 315, and a communication interface 317 which are connected by a bus 319, and also includes a wired transmission/reception part 325 and a wireless transmission/reception part 326 which are connected to the communication interface 317. In addition, as shown in FIG. 3, the vehicle wiper control device 30 includes a drive circuit 320 connected by the bus 319. The drive circuit 320 may include, for example, an inverter and a drive IC (see FIG. 3). The wiper motor 192 is connected to the drive circuit 320. Moreover, the drive circuit 320 and the wiper motor 192 may be elements of the in-vehicle electronic machine 38. In addition, the drive circuit 320 may be arranged separately from the vehicle wiper control device 30.

The auxiliary memory device 314 is, for example, a hard disk drive (HDD), an electrically erasable programmable read-only memory (EEPROM), a solid state drive (SSD), or the like, and is a memory device for memorizing data related to application software or the like.

The wired transmission/reception part 325 includes a transmission/reception part capable of communicating using a wired network. The wired network is, for example, a CAN, but may be in other forms such as Ethernet (registered trademark). The in-vehicle electronic machine 38 is connected to the wired transmission/reception part 325. However, a part of the in-vehicle electronic machine 38 or the entire in-vehicle electronic machine 38 may be connected to the bus 319 or may be connected to the wireless transmission/reception part 326.

The wireless transmission/reception part 326 is a transmission/reception part capable of communicating using a wireless network. The wireless network may include a wireless communication network of a mobile phone, the Internet, World Wide Web, Virtual Private Network (VPN), Wide Area Network (WAN), and the like. In addition, the wireless transmission/reception part 326 may include a short-distance wireless communication (NFC: Near Field Communication) part, a Bluetooth (registered trademark) communication part, a wireless-fidelity (Wi-Fi) transmission/reception part, an infrared transmission/reception part, and the like.

Moreover, the vehicle wiper control device 30 may be connectable to a recording medium 316. The recording medium 316 stores a predetermined program. The program stored in the recording medium 316 is installed in the auxiliary memory device 314 or the like of the vehicle wiper control device 30 via the drive device 315. The installed predetermined program can be executed by the CPU 311 of the vehicle wiper control device 30. For example, the recording medium 316 may be a recording medium such as a compact disc (CD)-ROM, a flexible disc, a magneto-optical disc, or the like that optically, electrically, or magnetically records information; a semiconductor memory such as a ROM, a flash memory, or the like that electrically records information; or the like.

Moreover, the hardware configuration shown in FIG. 3 is just an example and can be changed in various ways. For example, in a variation example, the wireless transmission/reception part 326 may be omitted, or the drive device 315 may be omitted.

Figure 4:
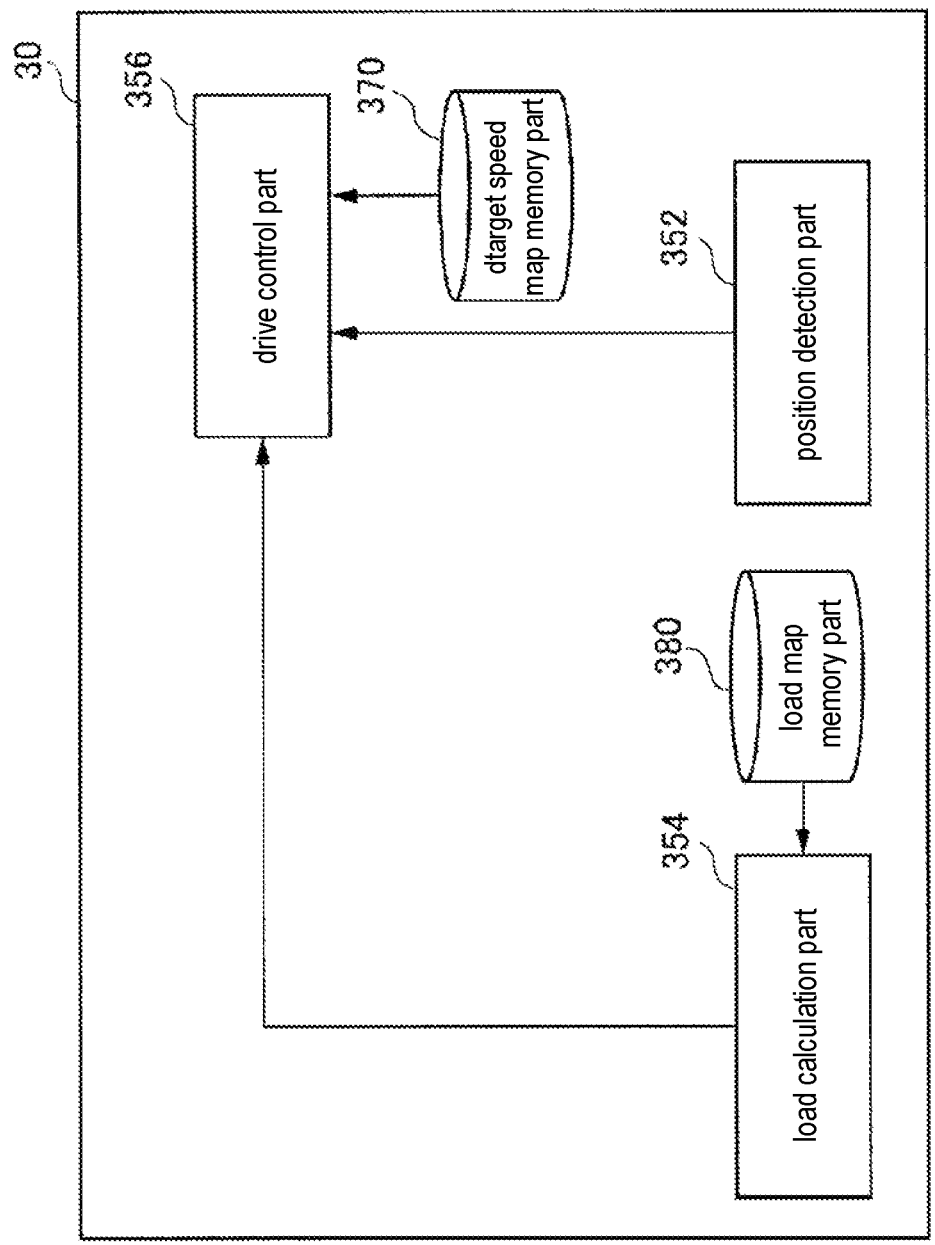
FIG. 4 is a diagram showing an example of a function achieved by the vehicle wiper control device.

FIG. 4 is a diagram showing an example of a function achieved by the vehicle wiper control device 30.

The vehicle wiper control device 30 includes a position detection part 352, a blade position estimation part 353, a load calculation part 354, a load determination part 355, a drive control part 356, a mode determination part 357, a vehicle speed determination part 358, a target speed map memory part 370, and a load map memory part 380. The position detection part 352, the blade position estimation part 353, the load calculation part 354, the load determination part 355, the drive control part 356, the mode determination part 357, and the vehicle speed determination part 358 can be achieved in a way that the CPU 311 executes a program in a memory device (for example, the ROM 313). The target speed map memory part 370 and the load map memory part 380 can be achieved by a memory device such as a ROM. Here, the drive control part 356 configures the drive part in the present invention.

The position detection part 352 detects the rotation angle of the wiper motor 192 based on the pulse signal from the rotation angle sensor 19*a*. In addition, the position detection part 352 identifies the rotation direction of the motor shaft 194 based on an appearance timing of the pulse from the Hall IC 1917. In addition, the position detection part 352 detects the rotation speed of the wiper motor 192 (the rotation speed of the motor shaft 194) from a cycle of the pulse output of either one of the hall ICs 1917. Moreover, there is a correlation based on a deceleration ratio and a link motion ratio between the rotation number of the motor shaft 194 and the moving speeds of the wiper blades 17 and 18, and the moving speeds of the wiper blades 17 and 18 can be calculated from the rotation number (rotation speed) of the motor shaft 194. Therefore, the position detection part 352 may calculate the moving speeds of the wiper blades 17 and 18 as necessary. The position detection part 352 generates wiper motor information representing the rotation angle, the rotation direction, and the rotation speed which are detected.

The blade position estimation part 353 generates position information of the wiper blades 17 and 18 based on the wiper motor information detected by the position detection part 352, a target speed map described later recorded in the target speed map memory part 370, and the like.

The load calculation part 354 receives, from the blade position estimation part, position information indicating that the wiper blades 17 and 18 are arranged at the upper reversal position P2 or the lower reversal position P1, and calculates (estimates) a load on the wiper motor 192 while the wiper blades 17 and 18 wipe from the upper reversal position P2 to the lower reversal position P1 (on a backward path). There are various methods for calculating the load on the wiper motor 192, and any method may be used. For example, the method for calculating the load on the wiper motor 192 may be a method as disclosed in Japanese Patent Application Laid-Open No. 2011-131779. Specifically, the load calculation part 354 may acquire the rotation number of the wiper motor 192 and the duty by the PWM control and calculate a load point (load) based on a load map (not shown) preset according to the rotation number and the duty. The load map is memorized in the load map memory part 380. The load map may show a relationship of the load with the rotation number and the duty in a manner that the higher the duty is, the higher the load is at the same rotation number, and in a manner that the lower the rotation number is, the higher the load is at the same duty.

Alternatively, the load calculation part 354 may calculate the load by using a combination of arbitrary parameters among various parameters such as the duty, an advance angle, an energization angle, the rotation number (the motor speed), a voltage (a power supply voltage used for motor drive), and the like. For example, the load map may be prepared for each advance angle and/or for each energization angle. In addition, in a configuration including a current sensor that detects a current applied to the wiper motor 192, the load calculation part 354 may calculate the load based on the current applied to the wiper motor 192.

In addition, the load calculation part 354 may calculate (adopt) a maximum value of each instantaneous value for the load on the wiper motor 192 while the wiper blades 17 and 18 wipe from the upper reversal position P2 to the lower reversal position P1, may calculate an average value of each instantaneous value while the wiper blades 17 and 18 wipe from the upper reversal position P2 to the lower reversal position P1, or may calculate an integrated value of each instantaneous value. In any case, a high-load state in which the wiper blades 17 and 18 are locked as described later can be detected by appropriately evaluating the calculated load value.

Moreover, the load calculation part 354 may calculate loads on the wiper motor 192 in other sections in addition to the backward path which is a period for the wiper blades 17 and 18 to wipe from the upper reversal position P2 to the lower reversal position P1. For example, the load calculation part 354 may always calculate loads on the wiper blades 17 and 18. However, while the wiper blades 17 and 18 wipe from the upper reversal position P2 to the lower reversal position P1 (on the backward path), the loads tend to be higher due to influence of running wind than loads while the wiper blades 17 and 18 wipe from the lower reversal position P1 to the upper reversal position P2 (on a forward path). Therefore, for control purposes, the load on the wiper motor 192 while the wiper blades 17 and 18 wipe from the upper reversal position P2 to the lower reversal position P1 is useful.

The load determination part 355 compares the calculated value of the load on the wiper motor 192 calculated by the load calculation part 354 with a predetermined threshold Th1. The predetermined threshold Th1 is a threshold for detecting a high load in order that the wiper blades 17 and 18 during drive are locked (stopped at a position between the lower reversal position P1 and the upper reversal position P2). The predetermined threshold Th1 may be a value close to a lower limit value Th0 of a load range when the wiper blades 17 and 18 are locked (however, a value smaller than the lower limit value Th0). The load determination part 355 generates high-load information when the calculated load value obtained by the load calculation part 354 exceeds the predetermined threshold Th1.

The mode determination part 357 determines the wiping mode of the wiper blades 17 and 18 selected by an operation of the wiper switch 381 by the user. The mode determination part 357 detects the operation of the wiper switch 381 and generates the wiping mode information.

The vehicle speed determination part 358 compares a travel speed of the vehicle detected by the wheel speed sensor 382 with a predetermined high-speed travel threshold. The high-speed travel threshold may be, for example, 110 to 120 km/h.

The drive control part 356 drives the wiper motor 192 via the drive circuit 320 in order that the wiper blades 17 and 18 reach target positions of the wiper blades 17 and 18. As the target position, the upper reversal position P2, the lower reversal position P1, the storage position P0, or the like may be set. At this time, the drive control part 356 drives the wiper motor 192 based on a target speed of the wiper blades 17 and 18 set corresponding to the positions of the wiper blades 17 and 18 on the surface to be wiped. Moreover, because moving speeds of the wiper blades 17 and 18 are determined according to the rotation speed of the wiper motor 192, the target speed of the wiper blades 17 and 18 is substantially the same concept as a target rotation speed of the rotation speed of the wiper motor 192. Therefore, in the following description, the target speed of the wiper blades 17 and 18 can also be read and applied as the target rotation speed of the rotation speed of the wiper motor 192.

For example, the drive control part 356 decides the target speed according to the position of the wiper blades 17 and 18 based on a target speed map (not shown) showing a relationship between the position of the wiper blades 17 and 18 (or the rotation angle of the wiper motor 192) and the target speed. The target speed map is memorized in the target speed map memory part 370. For example, the target speed map may be prepared for each kind of set value (for example, the wiping speed) that can be set by the wiper switch 381. When the drive control part 356 decides the target speed, the drive control part 356 decides control parameters of the wiper motor 192 in order that the wiper blades 17 and 18 are moved at the target speed. The control parameters are the duty, the advance angle, the energization angle, and the like. At this time, the drive control part 356 may achieve feedback control (for example, proportional-integral-differential (PID) control) according to a difference between the target speed and a current rotation speed of the wiper motor 192 based on the wiper motor information from the position detection part 352.

In addition, when the calculated load value obtained by the load calculation part 354 exceeds the predetermined threshold Th1, the drive control part 356 receives the high load information obtained by the load determination part 355 and executes wiper stop processing programs. When the wiper stop processing programs are executed, the drive control part 356 performs wiper stop processing for stopping the wiper blades 17 and 18 at the storage position P0 set below the lower reversal position P1 to prohibit the next wiping motion. Moreover, the wiper stop processing programs are stored in a memory device (for example, the ROM 313). In addition, the wiper stop processing programs include a first wiper stop processing program and a second wiper stop processing program which are described later.

Moreover, the drive control part 356 may execute two or more motor control modes including a first mode and a second mode. In the first mode, the wiper motor 192 is controlled at an advance angle and an energization angle according to the relationship (for example, difference) between the rotation number of the wiper motor 192 and the target speed, and in the second mode, the wiper motor 192 is controlled at an advance angle and an energization angle where a generated torque of the wiper motor 192 is maximized. The first mode is executed in a normal state. That is, in the normal state, the drive control part 356 controls, as described above, the advance angle and the energization angle of the wiper motor 192 according to the difference between the rotation speed of the wiper motor 192 and the target speed. In the second mode, the advance angle and the energization angle of the wiper motor 192 are fixed regardless of the target speed. There is a characteristic that in the first mode, a torque in a low rotation number range is small, and in the second mode, a torque in the low rotation number range is larger than that in the first mode, and thus, when the rotation speed is low due to the high load, the second mode is effective in outputting the relatively large torque. The drive control part 356 achieves the second mode at least partially (for example, when the wiper blades 17 and 18 are positioned between the lower reversal position P1 and the upper reversal position P2) during the wiper stop processing. In this case, the possibility that the wiper blades 17 and 18 are locked during the wiper stop processing can be reduced. Moreover, the normal state in which the first mode is achieved may be a state other than the execution duration of the wiper stop processing programs, or a state other than the execution duration of the wiper stop processing programs and other predetermined programs.

According to the example, as described above, when the calculated load value obtained by the load calculation part 354 exceeds the predetermined threshold Th1, the wiper stop processing is executed, and thus, the possibility of locking of the wiper blades 17 and 18 (locking due to a high load) at a position during wiping (a position between the lower reversal position P1 and the upper reversal position P2) can be reduced.

Specifically, in a situation where the calculated load value obtained by the load calculation part 354 exceeds the aforementioned lower limit value Th0, a torque high enough to be capable of withstanding the load is difficult to be generated for a long time by the wiper motor 192. If the torque generated by the wiper motor 192 is insufficient for a long time with respect to the load, the wiper blades 17 and 18 may be locked. Moreover, a load that is so high that the torque generated by the wiper motor 192 is insufficient is easy to be generated, for example, during high-speed travel or when the surface to be wiped of the front windshield glass 11 is dry, or the like.

If the wiper blades 17 and 18 are locked at the position during wiping due to the high load as described above, the user (for example, the driver) may feel uncomfortable. In addition, if the wiper blades 17 and 18 are locked at the position during wiping due to the high load, a view of the driver may be obstructed and it is not desirable from the viewpoint of commercial value and safety.

In this point, according to the example, as described above, the wiper blades 17 and 18 are stopped at the storage position P0 under the situation where the calculated load value obtained by the load calculation part 354 exceeds the predetermined threshold Th1. Therefore, according to the example, under the situation where the calculated load value obtained by the load calculation part 354 exceeds the predetermined threshold Th1, the wiper blades 17 and 18 stay at the storage position P0 and a new wiping motion is not executed. Accordingly, a possibility of locking the wiper blades 17 and 18 at a position during wiping (a position between the lower reversal position P1 and the upper reversal position P2) at the time of the new wiping motion can be reduced.

In addition, in the example, when the drive control part 356 stops the wiper blades 17 and 18 at the storage position P0 by the wiper stop processing, the energization to the wiper motor 192 is stopped. Therefore, the wiper motor 192 can be prevented from being continuously energized for a relatively long time in an overloaded state.

Moreover, in the example, once the wiper blades 17 and 18 are stopped by the wiper stop processing during the execution of the wiper stop processing programs, the drive control part 356 comes into a prohibition state in which the next wiping motion is prohibited. Accordingly, the next wiping motion of the wiper blades 17 and 18 can be prevented from being automatically started under a situation where the possibility that the wiper blades 17 and 18 are locked at the position during wiping is high. As a result, the inconvenience that may occur because of starting the next wiping motion, that is, the wiper blades 17 and 18 being locked at the position during wiping (the position between the lower reversal position P1 and the upper reversal position P2) at the time of the next wiping motion can be avoided.

In the example, for example, once the wiper blades 17 and 18 are stopped by the wiper stop processing, the drive control part 356 may maintain the stored state of the wiper blades 17 and 18 until a predetermined operation by the user is detected by the mode determination part. That is, when the prohibition state is executed by the wiper stop processing, the prohibition state is maintained until the predetermined operation by the user is detected. In this case, after the wiper blades 17 and 18 reach the storage position P0 by the wiper stop processing, the drive control part 356 does not start the energization to the wiper motor 192 until the predetermined operation by the user is detected. The predetermined operation is arbitrary and may be, for example, any operation other than an off operation for the wiper switch 381. In this case, for example, during the execution of the wiper stop processing programs, when any operation other than the off operation for the wiper switch 381 is performed by the user after the wiper blades 17 and 18 are stopped, it is considered as a wiping request (request to restart wiping) from the user, and a termination program that terminates the wiper stop processing is executed. When the termination program is executed, the drive control part 356 terminates the wiper stop processing and restarts the wiping motion of the wiper blades 17 and 18 in a wiper mode selected by the user. Moreover, the termination program is memorized in the memory device (for example, the ROM 313).

Next, a motion example using the vehicle wiper control device 30 is described with reference to a state transition diagram in FIG. 5.

Figure 5:
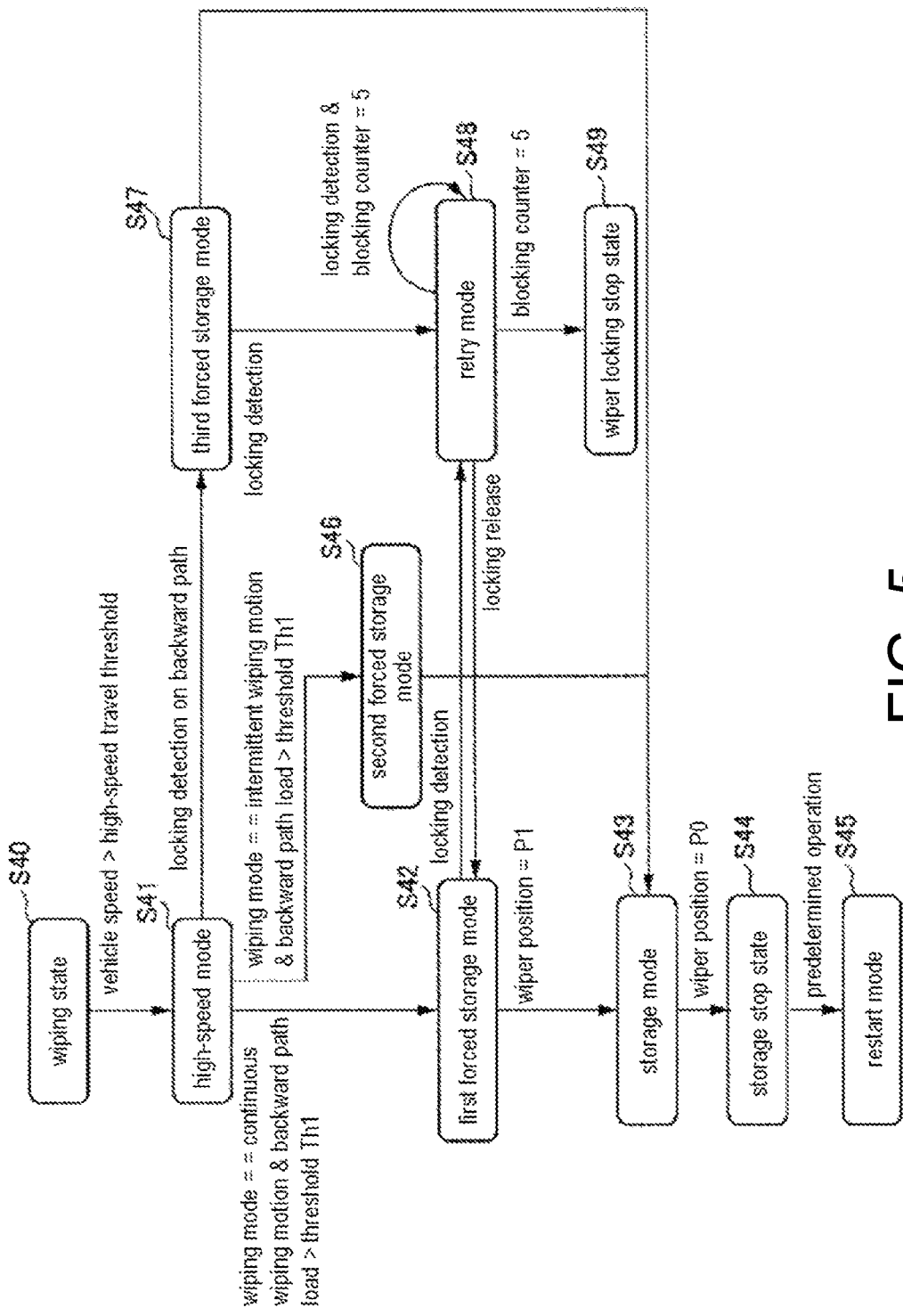
FIG. 5 is a transition diagram showing an example of a transition manner of control states of the vehicle wiper control device.

FIG. 5 is a transition diagram showing an example of a transition manner of control states of the vehicle wiper control device 30.

As shown in FIG. 5, the control states (and modes) of the vehicle wiper control device 30 include a wiping state S40, a high-speed mode S41, a first forced storage mode S42, a storage mode S43, a storage stop state S44, a restart mode S45, a second forced storage mode S46, a third forced storage mode S47, a retry mode S48, and a wiper locking stop state S49.

The wiping state S40 corresponds to an actuation state of the wiper device 12. The wiping state S40 corresponds to, for example, a state in which a high-speed continuous wiping motion (Hi), a low-speed continuous wiping motion (Lo), or an intermittent wiping motion (INT) is selected by the wiper switch 381. In addition, in a configuration including a rain sensor (not shown), the wiping state S40 may correspond to, for example, a state in which a rain sensor response wiping motion (Auto) is selected by the wiper switch 381 and the rain sensor detects raindrops.

The high-speed mode S41 is executed when the vehicle speed determination part 358 determines in the wiping state S40 that the vehicle speed exceeds a predetermined high-speed travel threshold.

The first forced storage mode S42 is executed when the wiping mode is a continuous wiping motion in the high-speed mode S41 and the load determination part 355 determines that the backward path load exceeds the threshold Th1. In other words, the drive control part 356 does not execute the wiper stop processing programs if the vehicle speed is equal to or lower than the high-speed travel threshold when the load exceeds the threshold Th1. The continuous wiping motion does not include the intermittent wiping motion (INT) and corresponds to a motion when Hi or Lo is selected by the wiper switch 381. In addition, the continuous wiping motion may include a motion when a setting state according to a detection result obtained by the rain sensor is the same in a state where Auto is selected by the wiper switch 381 as in a state where Hi or Lo is selected by the wiper switch 381. In addition, the continuous wiping motion may include a wiping motion after spraying a washer fluid. Moreover, the backward path load is calculated by the load calculation part 354 as described above.

A timing for determining whether the backward path load in the high-speed mode S41 exceeds the threshold Th1 may be a timing when the wiper blades 17 and 18 reach the lower reversal position P1. However, in the variation example in which the backward path load is evaluated by an instantaneous value or the like, the timing for determining whether the backward path load exceeds the threshold Th1 may be an arbitrary timing on the backward path.

The first forced storage mode S42 is a mode for performing the wiping motion only once with the maximum torque generated by the wiper motor 192 before shifting to the storage mode S43. For example, in the first forced storage mode S42, respectively, the target speed may be set to a predetermined speed V1 on the forward path, the target speed may be set to a predetermined speed V2 on the backward path, the advance angle may be set to a predetermined angle α1 on the reciprocating path, the energization angle may be set to a predetermined angle β1 on the reciprocating path, and the target position may be set to the lower reversal position P1 on the reciprocating path. In this case, the predetermined speed V2 may be the minimum value. In addition, the predetermined angle α1 and the predetermined angle β1 are set so that the torque generated by the wiper motor 192 is maximized. That is, in the first forced storage mode S42, the aforementioned second mode is executed as a motor control mode on the backward path. For example, the predetermined angle α1 may be about 20 degrees, and the predetermined angle β1 may be about 150 degrees.

The storage mode S43 is a mode that can be transitioned from any one of the first forced storage mode S42, the second forced storage mode S46, and the third forced storage mode S47. The storage mode S43 is transitioned when the wiper blades 17 and 18 reach the lower reversal position P1 in the first forced storage mode S42. In addition, the storage mode S43 is transitioned when the target position is set to the lower reversal position P1 in the second forced storage mode S46. In addition, the storage mode S43 is transitioned when the wiper blades 17 and 18 reach the lower reversal position P1 in the third forced storage mode S47.

In the storage mode S43, for example, a storage limit value may be set for the duty. In this case, the drive control part 356 controls the duty within a range not exceeding the storage limit value to bring the wiper blades 17 and 18 to the storage position P0.

The storage stop state S44 is transitioned when the wiper blades 17 and 18 reach the storage position P0 in the storage mode S43. The storage stop state S44 is maintained until the predetermined operation by the user is detected.

The restart mode S45 is transitioned when the predetermined operation by the user is detected in the storage stop state S44. In the restart mode S45, the drive control part 356 starts the wiping motion of the wiper blades 17 and 18. At this time, the drive control part 356 may drive the wiper motor 192 according to settings immediately before reaching the storage stop state S44. Alternatively, the drive control part 356 may drive the wiper motor 192 according to settings corresponding to the attribute of the predetermined operation.

The second forced storage mode S46 is executed when the wiping mode is the intermittent wiping motion and the backward path load exceeds the threshold Th1 in the high-speed mode S41. The second forced storage mode S46 is a mode for setting (changing) the target position to the lower reversal position P1 before shifting to the storage mode S43. Moreover, a timing for determining whether the backward path load exceeds the threshold Th1 may be the timing when the wiper blades 17 and 18 reach the lower reversal position P1. However, in the variation example in which the backward path load is evaluated by an instantaneous value or the like, the timing for determining whether the backward path load exceeds the threshold Th1 may be an arbitrary timing on the backward path.

The third forced storage mode S47 is transitioned when the locked state of the wiper blades 17 and 18 is detected in the high-speed mode S41. This transition may be achieved, for example, when the backward path load has exceeded a load of a level at which the wiper blades 17 and 18 are locked (the aforementioned lower limit value Th0) due to a gust or the like before the backward path load exceeds the threshold Th1 and the mode shifts to the first forced storage mode (that is, on the backward path). The third forced storage mode S47 is a mode for releasing the locked state of the wiper blades 17 and 18. In the third forced storage mode S47, respectively, the target speed may be set to the predetermined speed V2, the advance angle may be set to the predetermined angle α1, the energization angle may be set to the predetermined angle β1, and the target position may be set to the lower reversal position P1. That is, in the third forced storage mode S47, as in the first forced storage mode S42, various control parameters are set so that the torque generated by the wiper motor 192 is maximized. Therefore, in the third forced storage mode S47, the aforementioned second mode is executed as the motor control mode. Hereinafter, the drive of the wiper motor 192 in this third forced storage mode S47 is referred to as "retry drive". Moreover, when the wiper blades 17 and 18 reach the lower reversal position P1 as a result of the retry drive, the mode shifts to the storage mode S43 as described above.

The retry mode S48 is a mode that can be transitioned from any one of the first forced storage mode S42 and the third forced storage mode S47. The retry mode S48 is transitioned when the locked state is detected in the first forced storage mode S42. In addition, the retry mode S48 is transitioned when the locked state is detected again as a result of the retry drive in the third forced storage mode S47. Moreover, the locked state may be detected, for example, when the movement of the wiper blades 17 and 18 is not detected for a predetermined time or longer.

The retry mode S48 is a mode for releasing the locked state of the wiper blades 17 and 18. In the retry mode S48, respectively, the target speed may be set to the predetermined speed V2, the advance angle may be set to the predetermined angle α1, the energization angle may be set to the predetermined angle β1, and the target position may be set to the lower reversal position P1. That is, in the retry mode S48, as in the third forced storage mode S47, various control parameters are set so that the torque generated by the wiper motor 192 is maximized.

In the retry mode S48, when the locked state is detected again as a result of the retry drive, a blocking counter is incremented by "1". On the other hand, in the retry mode S48, when the locked state is released as a result of the retry drive, the mode shifts to the first forced storage mode S42. Moreover, an initial value of the blocking counter is "0", and when the locked state is released, the blocking counter is reset to "0".

The wiper locking stop state S49 is transitioned when the blocking counter reaches a predetermined value ("5" in the example) in the retry mode S48. In the wiper locking stop state S49, the wiper motor 192 is stopped.

In this way, according to the motion example shown in FIG. 5, in the high-speed mode S41 in which the locked state is likely to occur, when the backward path load exceeds the threshold Th1, the storage mode S43 and the storage stop state S44 can be executed via the first forced storage mode S42 or the second forced storage mode S46. Accordingly, in the high-speed mode S41 in which the locked state is likely to occur, there is a high possibility that the storage mode S43 and the storage stop state S44 can be executed without the locked state even in a high-load state where the possibility of the locked state is high. Accordingly, the possibility that the aforementioned inconvenience (inconvenience such as obstruction of the view of the driver, or the like) caused by the locked state can be reduced.

In addition, according to the motion example shown in FIG. 5, in the high-speed mode S41, when the backward path load exceeds the threshold Th1 in the continuous wiping motion, the storage mode S43 and the storage stop state S44 can be executed via the first forced storage mode S42. That is, in the high-speed mode S41, when the backward path load exceeds the threshold Th1 in the continuous wiping motion, the drive control part 356 moves the wiper blades 17 and 18 to the upper reversal position P2 and then moves the wiper blades 17 and 18 to the storage position P0 and stops the wiper blades 17 and 18 at the storage position P0 (an example of control using the first wiper stop processing program). Accordingly, the storage mode S43 and the storage stop state S44 are achieved after the (additional) wiping motion is executed only once, and thus, the wiper blades 17 and 18 can be moved to and stopped at the storage position P0 in a manner with reduced discomfort. Moreover, in the variation example, the storage mode S43 and the storage stop state S44 may be achieved after the wiping motion is executed twice or more, or the storage mode S43 and the storage mode S44 may be achieved without executing one wiping motion. Moreover, the latter case is the same as the second forced storage mode S46.

Moreover, in the motion example shown in FIG. 5, when brought into the storage stop state S44 from the first forced storage mode S42, the wiper blades 17 and 18 may be controlled into the storage stop state S44 without being stopped at the lower reversal position P1. That is, the wiper blades 17 and 18 may be moved from the upper reversal position P2 to the storage position P0 as the movement speed while the wiper blades 17 and 18 are moved to the lower reversal position P1 is maintained. In this case, the wiper blades 17 and 18 can be brought into the storage stop state S44 beyond the lower reversal position P1 in a natural flow of motion. However, in the variation example, when brought into the storage stop state S44 from the first forced storage mode S42, the wiper blades 17 and 18 may be controlled into the storage stop state S44 after being temporarily stopped at the lower reversal position P1.

In addition, according to the motion example shown in FIG. 5, in the high-speed mode S41, when the backward path load exceeds the threshold Th1 due to the intermittent wiping motion, the storage mode S43 and the storage stop state S44 can be executed via the second forced storage mode S46. That is, in the high-speed mode S41, when the backward path load exceeds the threshold Th1 due to the intermittent wiping motion, the drive control part 356 moves the wiper blades 17 and 18 to the storage position P0 and stops the wiper blades 17 and 18 at the storage position P0 without moving the wiper blades 17 and 18 to the upper reversal position P2 (an example of control using the second wiper stop processing program). Accordingly, the wiper blades 17 and 18 are moved to the storage position P0 after stopping (temporarily stopping) at the lower reversal position P1 accompanying the intermittent wiping motion, and thus, the wiper blades 17 and 18 can be brought into the storage stop state S44 in a flow of a natural motion related to the intermittent wiping motion. However, in the variation example, the wiper blades 17 and 18 may be brought into the storage stop state S44 after performing an additional wiping motion as in the case of the continuous wiping motion.

In addition, according to the motion example shown in FIG. 5, when the wiper blades 17 and 18 reach the lower reversal position P1 in the third forced storage mode S47, the storage mode S43 and the storage stop state S44 are achieved not via the first forced storage mode S42 (that is, without executing an additional wiping motion). Accordingly, in a high-load state in which the third forced storage mode S47 is executed, a possibility of being locked again during the additional wiping motion can be eliminated.

Moreover, in the motion example shown in FIG. 5, when the locked state is released in the retry mode S48, the mode is shifted to the first forced storage mode S42, but the present invention is not limited hereto. For example, when the locked state is released in the retry mode S48, the mode may be shifted to the second forced storage mode S46. In this case, the storage mode S43 and the storage stop state S44 are achieved without executing the additional wiping motion. Accordingly, in a high-load state in which the retry mode S48 is executed, a possibility of being locked again during the additional wiping motion can be eliminated.

In addition, although not shown in FIG. 5, the control states of the vehicle wiper control device 30 may have other states. For example, the control states of the vehicle wiper control device 30 may include an emergency motion state and a thermal protection motion state. The emergency motion state is a state in which the wiping motion by the wiper blades 17 and 18 is urgently achieved under predetermined conditions, and the thermal protection motion state is a state in which the wiping motion by the wiper blades 17 and 18 is achieved in a manner of reducing damage to the wiper motor 192 and the like due to heat. When the control state of the vehicle wiper control device 30 is the emergency motion state or the thermal protection motion state, the first forced storage mode S42, the second forced storage mode S46, and the third forced storage mode S47 may not be executed.

In addition, in the motion example shown in FIG. 5, the first forced storage mode S42 and the second forced storage mode S46 are executed regardless of the state of the surface to be wiped, but the present invention is not limited hereto. For example, the first forced storage mode S42 and the second forced storage mode S46 may be executed only when the surface to be wiped is in a relatively dry state. This is because when the surface to be wiped is in the relatively dry state, a frictional force between the wiper blades 17 and 18 and the surface to be wiped is higher than in a wet state and the load is easy to be high. In this case, the state of the surface to be wiped may be determined based on an amount of raindrops that can be detected by the rain sensor.

Although each example has been described above in detail, the present invention is not limited to a specific example, and various modifications and changes can be made within the scope of the claims. In addition, all or a plurality of the constituent elements of the above-described examples can also be combined.

For example, in the above-described examples, the power transmission mechanism 20 is used, but the present invention is not limited hereto. For example, the wiper arm 14 may be directly attached to the output shaft 195 of the wiper motor 192 without using the power transmission mechanism 20.

In addition, in the above-described examples, the wiper motor 192 is a brushless motor, and may be a brushed motor. Furthermore, in the above-described examples, the wiper blades 17 and 18 are held at the storage position P0 when the wiper device 12 is off or the like, but the present invention is not limited hereto. For example, in a vehicle that does not have the storage position P0 on the surface to be wiped, the storage position P0 may be replaced with the lower reversal position P1 to perform each wiping motion.

<Additions>

Moreover, the following embodiments are further disclosed for the above examples.

Embodiment 1

A vehicle wiper control device, including: wiper blades that are capable of being disposed on a surface to be wiped of a windshield glass of a vehicle and that perform a reciprocating wiping motion between a lower reversal position and an upper reversal position which are set on the surface to be wiped;

an electric motor that reciprocates the wiper blades on the surface to be wiped;

a drive part that drives the electric motor;

a load calculation part that calculates a load on the electric motor while the wiper blades wipe from the upper reversal position to the lower reversal position;

a load determination part that compares a calculated value of the load calculated by the load calculation part with a predetermined threshold; and a memory device that memorizes a wiper stop processing program for stopping the wiper blades, wherein if the load determination part determines that the calculated value exceeds the predetermined threshold, the drive part executes the wiper stop processing programs, and performs wiper stop processing for stopping the wiper blade at the lower reversal position or at a storage position set below the lower reversal position to prohibit the next wiping motion.

According to Embodiment 1, if the calculated load value exceeds the predetermined threshold, the wiper stop processing is executed, and thus, inconvenience (that is, locking of the wiper blade or the like) can be reduced which may occur when the reciprocating wiping motion of the wiper blade is still continued as usual even if the calculated load value exceeds the predetermined threshold. That is, the electric motor can be stopped in a manner that the wiper blade does not obstruct a view of a driver when the load on the electric motor is relatively high.

Embodiment 2

The vehicle wiper control device according to Embodiment 1, wherein during the execution of the wiper stop processing programs, the drive part moves the wiper blades to the upper reversal position, and then moves the wiper blades to the storage position and stops the wiper blades at the storage position to prohibit the next wiping motion.

According to Embodiment 2, when the calculated load value exceeds the predetermined threshold, the wiper blades are stopped at the storage position after undergoing the additional reciprocating wiping motion, and thus, the wiper stop processing can be achieved in a manner with reduced discomfort.

Embodiment 3

The vehicle wiper control device according to Embodiment 2, wherein during the execution of the wiper stop processing program, when the drive part moves the wiper blades to the upper reversal position and then moves the wiper blades to the storage position, the drive part does not stop the wiper blades at the lower reversal position.

According to Embodiment 3, the wiper blades can be brought to the storage position in a continuous manner from the reciprocating wiping motion, and the wiper stop processing can be achieved in the manner with reduced discomfort.

Embodiment 4

The vehicle wiper control device according to Embodiment 1, wherein the memory device memorizes a first wiper stop processing program and a second wiper stop processing program as the wiper stop processing program; and during the execution of the first wiper stop processing program, the drive part moves the wiper blades to the upper reversal position, and then moves the wiper blades to the storage position and stops the wiper blades at the storage position, and during the execution of the second wiper stop processing program, the drive part moves the wiper blades to the storage position and stops the wiper blades at the storage position without moving the wiper blades to the upper reversal position.

According to Embodiment 4, because a plurality of types of wiper stop processing can be selectively used, for example, appropriate wiper stop processing according to a wiping mode or the like can be achieved.

Embodiment 5

The vehicle wiper control device according to Embodiment 4, wherein the drive part causes the wiper blades to perform a continuous wiping motion or an intermittent wiping motion in response to an operation of a wiper switch arranged on the vehicle; if the load determination part determines that the calculated value exceeds the predetermined threshold, the drive part executes the first wiper stop processing program when the wiper blades are in the continuous wiping motion and executes the second wiper stop processing program when the wiper blades are in the intermittent wiping motion.

According to Embodiment 5, the appropriate wiper stop processing according to the wiping mode can be achieved. For example, because the first wiper stop processing program is executed when the wiping mode is the continuous wiping motion, the discomfort which may be given to the user can be reduced by the additional reciprocating wiping motion.

Embodiment 6

The vehicle wiper control device according to any one of Embodiments 1 to 5, further including:

a vehicle speed detection part that detects a travel speed of the vehicle; and a vehicle speed determination part that compares the travel speed of the vehicle detected by the vehicle speed detection part with a predetermined speed, wherein at a time point when the load determination part determines that the calculated value exceeds the predetermined threshold, if the travel speed detected by the vehicle speed detection part is equal to or less than the predetermined speed, the drive part does not execute the wiper stop processing program.

According to Embodiment 6, when the calculated value of the load exceeds the predetermined threshold and the travel speed of the vehicle exceeds the predetermined speed, a possibility that the locking of the wiper blades occur is high, and thus, the wiper stop processing can be achieved under this situation.

Embodiment 7

The vehicle wiper control device according to any one of Embodiments 1 to 6, wherein the electric motor is a brushless motor in which a rotor rotates by energizing a coil;

the memory device memorizes a first mode and a second mode as a program for controlling an advance angle and an energization angle of the electric motor;

if the first mode is selected, the drive part controls the electric motor at the advance angle and the energization angle corresponding to a relationship between a target speed of the wiper blades or a target rotation speed of the electric motor and a rotation speed of the electric motor, wherein the target speed of the wiper blades is set corresponding to a position of the wiper blades on the surface to be wiped, and if the second mode is selected, the drive part controls the electric motor at the advance angle and the energization angle where a generated torque of the electric motor is maximized; and the drive part executes the second mode while the wiper blades are positioned between the lower reversal position and the upper reversal position during the execution of the wiper stop processing programs.

According to Embodiment 7, the possibility that the locking of the wiper blades occurs during the execution of the wiper stop processing can be reduced.

Embodiment 8

The vehicle wiper control device according to any one of Embodiments 1 to 7, wherein the memory device memorizes a termination program for terminating the wiper stop processing programs; and during the execution of the wiper stop processing programs, if a predetermined operation by a user is detected after the wiper blades are stopped, the drive part restarts the reciprocating wiping motion of the wiper blades.

According to Embodiment 8, a prohibition state for the next wiping motion of the wiper blades are released based on the predetermined operation by the user. That is, the user can restart the reciprocating wiping motion of the wiper blades by performing the predetermined operation.

Embodiment 9

A vehicle wiper control method that is executed by a computer, including: driving an electric motor and thereby causing wiper blades to reciprocally wipe between a lower reversal position and an upper reversal position set on a surface to be wiped of a windshield glass of a vehicle; calculating a load on the electric motor while the wiper blades wipe from the upper reversal position to the lower reversal position; and stopping the wiper blades at the lower reversal position or at a storage position which is set below the lower reversal position when a calculated value of the load exceeds a predetermined threshold.

According to Embodiment 9, when the calculated value of the load exceeds the predetermined threshold, the wiper blades are stopped at the lower reversal position or the storage position, and thus, inconvenience (that is, locking of the wiper blade or the like) can be reduced which may occur when the reciprocating wiping motion of the wiper blades are still continued as usual even if the calculated load value exceeds the predetermined threshold. That is, the electric motor can be stopped in the manner that the wiper blades do not obstruct the view of the driver when the load on the electric motor is relatively high.

What is claimed is:

1. A vehicle wiper control device, comprising: wiper blades that are capable of being disposed on a surface to be wiped of a windshield glass of a vehicle and that perform a reciprocating wiping motion between a lower reversal position and an upper reversal position which are set on the surface to be wiped;

an electric motor that reciprocates the wiper blades on the surface to be wiped;

a driver that drives the electric motor;

a processor, configured to calculate, when the wiper blades reach the lower reversal position, a load on the electric motor while the wiper blades wipe from the upper reversal position to the lower reversal position and compares a calculated value of the load calculated by the processor with a predetermined threshold; and a memory device that memorizes a wiper stop processing program for stopping the wiper blades, wherein in a case that the processor determines that the calculated value exceeds the predetermined threshold, the driver executes the wiper stop processing program, and performs wiper stop processing for stopping the wiper blades at a storage position set below the lower reversal position to prohibit a next wiping motion, wherein during executing the wiper stop processing program, the driver moves the wiper blades to the upper reversal position, and then moves the wiper blades to the storage position and stops the wiper blades at the storage position to prohibit the next wiping motion, and during executing of the wiper stop processing program, when the driver moves the wiper blades to the upper reversal position and then moves the wiper blades to the storage position, the driver does not stop the wiper blades at the lower reversal position.

2. The vehicle wiper control device according to claim 1, wherein the memory device memorizes a first wiper stop processing program and a second wiper stop processing program as the wiper stop processing program; and during executing the first wiper stop processing program, the driver moves the wiper blades to the upper reversal position, and then moves the wiper blades to the storage position and stops the wiper blades at the storage position, and during executing the second wiper stop processing program, the driver moves the wiper blades to the storage position and stops the wiper blades at the storage position without moving the wiper blade to the upper reversal position.

3. The vehicle wiper control device according to claim 2, wherein the driver causes the wiper blades to perform a continuous wiping motion or an intermittent wiping motion in response to an operation of a wiper switch arranged on the vehicle; in a case that the processor determines that the calculated value exceeds the predetermined threshold, the driver executes the first wiper stop processing program when the wiper blades are in the continuous wiping motion and executes the second wiper stop processing program when the wiper blades are in the intermittent wiping motion.

4. The vehicle wiper control device according to claim 1, wherein the processor is further configured to:

detect a travel speed of the vehicle; and compares the travel speed of the vehicle detected by the processor with a predetermined speed, wherein at a time point when the processor determines that the calculated value exceeds the predetermined threshold, in a case that the travel speed detected by the processor is equal to or less than the predetermined speed, the driver does not execute the wiper stop processing program.

5. The vehicle wiper control device according to claim 1, wherein the electric motor is a brushless motor in which a rotor rotates by energizing a coil, the memory device memorizes a first mode and a second mode as a program for controlling an advance angle and an energization angle of the electric motor, in a case that the first mode is selected, the driver controls the electric motor at the advance angle and the energization angle corresponding to a relationship between a target speed of the wiper blades or a target rotation speed of the electric motor and a rotation speed of the electric motor, wherein the target speed of the wiper blades is set corresponding to a position of the wiper blades on the surface to be wiped, and in a case that the second mode is selected, the driver controls the electric motor at the advance angle and the energization angle where a generated torque of the electric motor is maximized, and the driver executes the second mode while the wiper blades are positioned between the lower reversal position and the upper reversal position during executing the wiper stop processing program.

6. The vehicle wiper control device according to claim 1, wherein the memory device memorizes a termination program for terminating the wiper stop processing program, and during executing the wiper stop processing program, in a case that a predetermined operation by a user is detected after the wiper blades are stopped, the driver restarts the reciprocating wiping motion of the wiper blades.

7. A vehicle wiper control method that is executed by a computer, comprising:

driving an electric motor and thereby causing wiper blades to reciprocally wipe between a lower reversal position and an upper reversal position set on a surface to be wiped of a windshield glass of a vehicle;

calculating, when the wiper blades reach the lower reversal position, a load on the electric motor while the wiper blades wipe from the upper reversal position to the lower reversal position; and stopping the wiper blades at a storage position which is set below the lower reversal position when a calculated value of the load exceeds a predetermined threshold, to prohibit a next wiping motion, wherein during executing the wiper stop processing program, the driver moves the wiper blades to the upper reversal position, and then moves the wiper blades to the storage position and stops the wiper blades at the storage position to prohibit the next wiping motion, and during executing of the wiper stop processing program, when the driver moves the wiper blades to the upper reversal position and then moves the wiper blades to the storage position, the driver does not stop the wiper blades at the lower reversal position.

* * * * *